United States Patent [19]

Correlli

[11] Patent Number: 4,519,143

[45] Date of Patent: May 28, 1985

[54] SHEET METAL BENDING POSITION MARKER SYSTEM

[76] Inventor: Antonino E. Correlli, 7919 35th St., Baltimore, Md. 21237

[21] Appl. No.: 578,060

[22] Filed: Feb. 8, 1984

[51] Int. Cl.³ ........................ B23Q 35/02; B23B 49/02

[52] U.S. Cl. ........................................ 33/189; 33/529; 33/562

[58] Field of Search ................ 33/1 G, 1 AA, 174 G, 33/189-192

[56] References Cited

U.S. PATENT DOCUMENTS

| | | | |
|---|---|---|---|
| 800,257 | 9/1905 | Abetz | 33/189 |
| 1,302,645 | 5/1919 | Emery | 33/189 |
| 1,636,025 | 7/1927 | Waelde . | |
| 1,668,683 | 5/1928 | Koubek | 33/189 |
| 3,151,401 | 10/1964 | Bender | 33/189 |

FOREIGN PATENT DOCUMENTS

| | | | |
|---|---|---|---|
| 701047 | 1/1931 | France | 33/189 |

*Primary Examiner*—Robert S. Ward
*Attorney, Agent, or Firm*—John F. McClellan, Sr.

[57] ABSTRACT

A hand-operated sheet metal layout and marking tool supports sheet metal on a base where it may be laterally guided by a fence adapted for use at either side of the sheet metal, and permanently marks location of bend lines to be made, by means of a die-head carrying a row of pointed dies and pivotal for simultaneously impinging the dies against the sheet metal. The base has a recess along it in alignment with the row of dies to permit the sheet metal to yield for easier indenting. Spacing between the dies is easily set by means of a scale fixed on the base, and a die carrier ring carrying each die, that slides along a grooved rod coaxial with the similar rings carrying the other dies and can be fixed in position by a set screw that rides in the rod groove. When desired, any die can be swung out of operation, and all can be swung together by rotating the rod.

18 Claims, 3 Drawing Figures

SHEET METAL BENDING POSITION MARKER SYSTEM

FIELD OF THE INVENTION

This invention relates generally to sheet metal layout and marking and specifically to an adjustable tool for indicating bending lines on sheet metal to be bent.

SUMMARY OF THE INVENTION

In the prior art, a sheet metal marking device is disclosed in U.S. Pat. No. 1,668,683 issued to F. P. Koubek on May 8, 1928, that has a series of marking pins adjustably deployed along a leg pivoted with respect to an angle with a depression therealong so that the marking pins will in succession indent a piece of sheet metal placed over the depression at a location selectable with the aid of scale markings, unless thickness is exact.

Also, U.S. Pat. No. 1,636,025 issued to G. F. Waelde on July 19, 1927 disclosed a member for holding point-up a plurality of pointed members threaded in selected holes point-up, and over which a piece of sheet metal is positioned with the aid of a slidable guide. Hammering on the sheet metal can produce indentations in the sheet metal indicative of bend lines.

Objects of the present invention are to provide a system for marking bend lines in sheet metal that is more accurate and more versatile than prior known devices for the purposes, and is at the same time easier to use and provides better visibility of the area to be marked, with inherent accuracy.

Further objects are to provide a system as described that marks simultaneously instead of progressively, any thickness within a range of thicknesses, and in one fluent motion, that marks in an axis perpendicular to the length of sheet metal worked, that employs the same setting for each of the adjustable marking point assemblies and marks uniformly across the work, and that can use a relatively large number of such assemblies.

Yet further objects are to provide a system as described that can be set up easily and quickly to mark from either right-hand margin or from left hand margin, with equal speed, ease and accuracy.

Still further objects are to provide a system as described that requires only a few parts and those of common materials needing only a minimum of fabrication and assembly and adjustment, and that is economical, safe, easy to transport and is durable and is attractive in appearance. Among the safety features is the provision that points of dies rest at the base in a groove when the system is not in use.

BRIEF DESCRIPTION OF THE DRAWINGS

The above and other objects and advantages of this invention will become more readily apparent on examination of the following description, including the drawings in which like reference numerals refer to like parts.

GENERAL DESCRIPTION

The invention comprises a hand-operated die carrying head that pivots relative to a base so that a plurality of dies carried all in parallel in a row by the head, simultaneously indent a plurality of markings for bend lines in sheet metal work located on the base by a fence.

Inter-die spacing is aided by a scale on the base providing die-point measurement from either end of the base in conjunction with a fence or guide that can be used at either end. Each die is carried by a ring that can be slid along an elongate die-carrier or grooved rod coaxial with the rings of the other dies, and set, with a thumbscrew that protrudes into the groove, in desired location. A recess along the base beneath the line of descent of the dies provides for easier indentation of sheet metal by the dies. Swing-away of the dies individually or together provides easy adjustment and inspection, and replacement when desired. Bending is usually longitudinal, with one die marking for each bend.

DETAILED DESCRIPTION

Figure 1:
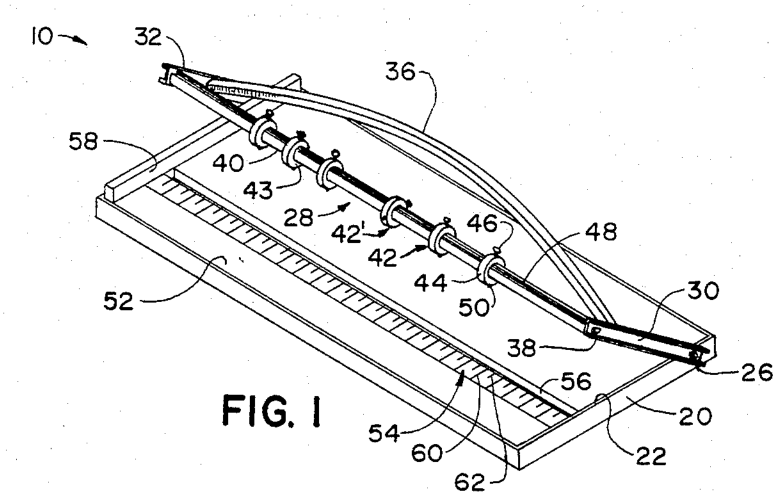
FIG. 1 is a perspective view of the invention held in open position ready to receive work.
Figure 2:
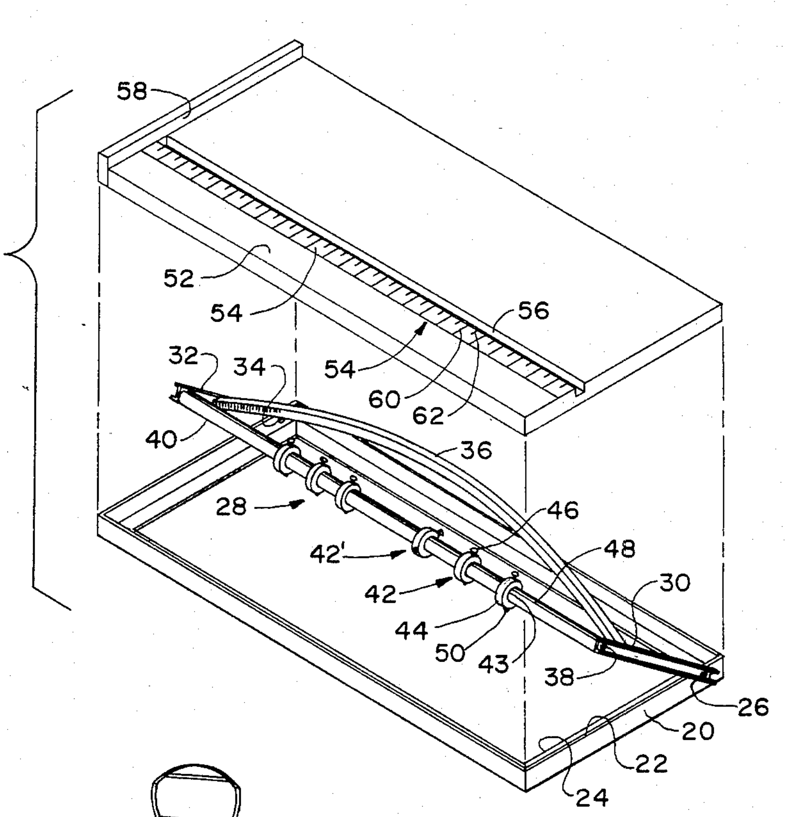
FIG. 2 is an exploded perspective view showing simplicity and ruggedness of the elements.

FIGS. 1 and 2 show the invention in embodiment 10. Base frame 20 comprises a unitary rectangular frame of angle iron with vertical legs 22 oriented upward around the perimeter, horizontal legs 24 inward at the bottom and corners mitered and welded or otherwise affixed together.

Hinged to the base frame by a respective pivot bolt 26 on each end adjacent a rear corner is a pivoting die-carrier 28. This has, as means for pivoting about an axis along the frame, two channel-section legs 30, 32 with, at the base frame, suitable holes 34 for attachment by the pivot bolts 26. Joining the two channel-section legs near the free ends of the legs is an upwardly-bowed handle 36 welded to them. This handle may be of iron also and highest, for best-hand clearance, in the middle.

Fitted between the channel-section legs and held in pivotal adjustment about the long axis by a respective clamping bolt 38 through each channel-section leg, at the free end of the leg, is a die carrier rod 40; this is parallel spaced from the pivot axis as a means for causing all dies, to be described, to impinge simultaneously on sheet metal to be marked, regardless of thickness within a range of thicknesses. Each of the clamping bolts 38 screws into a respective tapped hole in each end of the die carrier rod as will be shown, and serves as means for adjusting rotational position of the die carrier rod.

On the die-carrier rod may be any useful member, six shown, of adjustable die carriers or members 42 or means for holding dies. Each of these receives the die carrier rod through a central hole 43 therein.

Each die-carrier is a cylindrical ring or pipe-like member 44, of steel and having coaxial first and second preferably identical-thread tapped holes transversely through it.

The first tapped hole has threaded in it a thumb screw type set-screw 46 which can enter and closely engage sides and bottom of a rectangular-section groove 48 longitudinally along the length of the die carrier rod 40.

Co-axially aligned with the first tapped hole in each ring is the second tapped hole. Threaded in the second tapped hole is a pointed die 50, point outward.

The die points may all be held aligned in the same direction by engagement of the set-screws in the groove, or, if one (or more) is not necessary to be used for a particular marking, it may be turned and clamped out of alignment as shown for the die-carrier 42'.

The thumbscrews, being retractable, provide a means permitting swinging dies out of the way when not wanted or for inspection, when out the groove, and for precise alignment and inter-die spacing of the dies when in the groove.

Base 52 is a rectangular member, preferably of plywood, that fits flush into the base frame 20, and has means for indicating inter-die spacing, in the form of a scale 54 cemented or otherwise held longitudinally to the base in a position laterally adjacent the points of the dies when the pivoting frame is pivoted downward. Longitudinal recess 56 in the base receives the points of the dies in this downward position unless a piece of sheet metal is on the base.

When sheet metal is to be marked, fence 58 upwardly protrusive along one end of the base 52 guides the sheet metal and provides a zero position relative to the scale.

The fence 58, which is held by and between the end of the base and the frame, can be placed at either end. The zero position for the scale then is at either end desired. The scale 54 preferably has one set of markings 60 increasing from right to left; for easy die spacing either way, another set 62 increases from left to right.

Figure 3:
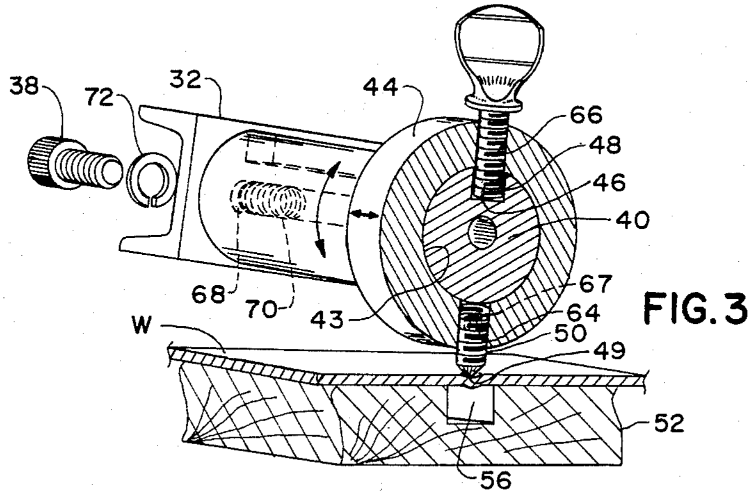
FIG. 3 is a fragmentary perspective detail showing relation of the backing plate, work, an adjustable point assembly and way for same, and mounting of the way to a swinging arm.

FIG. 3 shows the base 52 with longitudinal recess 56 beneath a piece of sheet metal or other work W being impressed with a marking by the point 49 of a die 50 that is threaded into coaxial second hole 64 in cylindrical ring 44 which also holds preferably flat-end thumbscrew type set-screw 46 threaded into first coaxial tube 66. For economy the dies may be standard pointed headless Allen set screws with sockets 67 for adjustment. Die-carrier rod 40 has the longitudinal rectangular section groove 48 engagable by the set screws of the various die-carrier assemblies to hold them in alignment. The die-carrier rod attaches to the channel-section legs, 32 shown, by means of a clamping screw 38 at each end that passes through a clearance hole 68 and threads coaxially into the threaded hole 70 in the end of the die carrier rod 40. Lock washers 72 help prevent loosening under the heavy use.

The double-headed arrows indicate adjustments. All die carriers when engaged with the groove can together be adjusted in rotation about the axis of the die carrier rod 40, to get the exact angle of attack desired. The importance of this can be seen by two instances: if the work is substantially thicker than the usual flat sheet metal (as, for example, with non-planar work) optimum die orientation may be obtained by this adjustment; also if it is desired to let the points of the dies all swing out toward the user together for inspection, or to touch the scale for setting minutely accurate spacing, if required; this can be done and then the dies all swung back together and re-fixed using the clamping screws.

During assembly and use and adjustment the bowed handle, which is welded in place, keeps the pivoting assembly in alignment, with or without the pivot bolts.

Mild steel may be employed for the metal parts except the dies.

Dimensions may be, in a convenient size for cornice and molding work:

Length O.A.: 26 inches (66 cm)
Depth O.A.: 12 inches (30 cm)
Thickness of base: $\frac{1}{2}$ inch (1.3 cm)
Thickness of rings: 1 inch (2.5 cm)
Outer diameter of rings: $1\frac{1}{2}$ inch (3.7 cm)
Diameter of rod: $\frac{7}{8}$ inch (2.4 cm)
Angle: $1\frac{1}{4}$ by $1\frac{1}{4}$ by $\frac{1}{8}$ inch thick (3.2 by 3.2 by 0.3 cm)
Channel: 1 by $\frac{1}{2}$ by $\frac{1}{8}$ inch thick (2.5 by 1.3 by 0.3 cm).

Threads for fasteners may all be $\frac{3}{8}$-16 (inch).

Sheet metal can range in thickness, without die adjustment, from 10 gauge to 36 gauge.

In conclusion, it will be seen that the invention can be made in any desired size, is easily carried about and set-up for work instantly., is easily maintained and supplied quickly and economically with replacement dies at very low cost, and is easily adjustable by rotating the dies using pliers, without need for disassembly.

Dies can easily be removed by unscrewing them either with an Allen wrench when the rings are disassembled or with pliers without disassembly of the rings from the die carrier rod. Sharpening or re-pointing of a die is quick and easy with it chucked in an electric hand drill to rotate it and with a piece of sandpaper to abrade it to like-new shape. The smooth contours of the rings make operation safer and visibility better, and provide for economical fabrication by cutting them successively from a length of pipe.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a system for layout and marking of sheet metal on a base by a row of dies having respective points and means for holding the dies mutually parallel in adjustably slidable relation along die carrier rod pivoted relative points against and marking said sheet metal, the improvement comprising: means for causing said movement to move all said die points simultaneously against sheet metal, of any thickness within a range of thicknesses, including the pivoting of the die carrier rod by the means for pivoting being about an axis parallel-spaced from the die-carrier rod.

2. In a system as recited in claim 1, said means for causing including each said die having an axis, and means for axially adjusting each said die.

3. In a system as recited in claim 2, the means for axially adjusting comprisng: said dies having screw threads engaging respective threaded holes in said means for holding.

4. In a system as recited in claim 3, and the means for axially adjusting including said dies having sockets for use in turning said dies.

5. In a system as recited in claim 1, the means for holding the dies mutually parallel including means permitting swinging any number of said dies out of parallelism for preventing said movement thereof against sheet metal.

6. In a system as recited in claim 5, the means permitting swinging including each means for holding including a member receiving the die carrier rod therethrough.

7. In a system as recited in claim 6, the means for holding further including the die carrier rod having a groove therealong, and protrusion from each said member extending into said groove.

8. In a system as recited in claim 7, the means for swinging further comprising said protrusion having threaded connection with said member for retracting said protrusion from the groove.

9. In a system as recited in claim 7, said member being cylindrical pipe-shape.

10. In a system as recited in claim 9, said means for holding including each member having a first threaded hole therein for engaging a die, said threaded connection including a second threaded hole in said member, and said first and second threaded holes being coaxially disposed transversely through said member.

11. In a system as recited in claim 10, said first and second threaded holes having the same size threads.

12. In a system as recited in claim 8, said groove being defined by said rod as a rectangular cross-section groove, and said protrusion fitting the groove rectangular cross-section.

13. In a system as recited in claim 6, the means permitting swinging including means for adjustably fixing rotational position of said die carrier rod about an axis extending therealong, relative to said means for pivoting.

14. In a system as recited in claim 1, said base being substantially rectangular, and a frame holding said base.

15. In a system as recited in claim 14, said base having a groove therealong beneath said dies, and a scale extending along the base adjacent the groove.

16. In a system as recited in claim 15, the base being of wood.

17. In a system as recited in claim 15, a guide detachably held between an end of the base and the frame, said guide, base and frame proportioned for holding said guide at either end of the base and frame, and said scale having graduations thereon providing for measuring along the base from the guide when the guide is located at either end of the base.

18. In a system as recited in claim 1, the means for pivoting having first and second portions, a handle joining the first and second portions and extending along the length of said die carrier rod in parallel-spaced relation with the die carrier rod.

* * * * *

UNITED STATES PATENT AND TRADEMARK OFFICE
CERTIFICATE OF CORRECTION

PATENT NO. : 4,519,143
DATED : May 28, 1985
INVENTOR(S) : ANTONINO E. CORRELLI

It is certified that error appears in the above-identified patent and that said Letters Patent are hereby corrected as shown below:

Claim 1, line 4, after "along" insert -- a --;

line 5, after "tive" insert -- to the base, by a means for pivoting, for moving the die -- .

Signed and Sealed this

*Tenth* Day of *September 1985*

[SEAL]

*Attest:*

DONALD J. QUIGG

*Attesting Officer* *Acting Commissioner of Patents and Trademarks - Designate*